United States Patent [19]

Enders et al.

[11] Patent Number: 4,718,968

[45] Date of Patent: Jan. 12, 1988

[54] FINGER PLY DOWN FOR TIRE BUILDING MACHINE

[75] Inventors: George E. Enders, Salem; Anand P. Singh, Youngstown; Gary R. Naylor, Canfield, all of Ohio

[73] Assignee: NRM Corporation, Columbiana, Ohio

[21] Appl. No.: 724,579

[22] Filed: Apr. 18, 1985

[51] Int. Cl.[4] ............................................. B29D 30/32
[52] U.S. Cl. .................................... 156/400; 156/132; 156/403
[58] Field of Search ............... 156/132, 131, 400, 401, 156/402, 403; 24/19, 269, 274 R, 274 WB; 81/9.3

[56] References Cited

U.S. PATENT DOCUMENTS

| | | | |
|---|---|---|---|
| 3,233,922 | 2/1966 | Evans | 24/19 X |
| 3,438,832 | 4/1969 | Cantarutti | 156/401 |
| 3,728,194 | 4/1973 | Enders | 156/401 X |
| 3,772,125 | 11/1973 | Leblond | 156/132 X |
| 4,214,940 | 7/1980 | Rost | 156/132 X |
| 4,238,268 | 12/1980 | McGaughey | 156/401 X |
| 4,302,274 | 11/1981 | Enders | 156/401 |
| 4,353,771 | 10/1982 | Yuhas | 156/403 |
| 4,546,524 | 10/1985 | Kreft | 24/274 R |

Primary Examiner—Donald E. Czaja
Assistant Examiner—Ramon R. Hoch
Attorney, Agent, or Firm—Renner, Otto, Boisselle & Lyon

[57] ABSTRACT

A spring finger ply down for a tire building machine comprising an annular array of spring fingers, an annular support for the fingers and a constrictable clamp for securing each finger to the support at an axial interference between each finger and the support. The constrictable clamp includes an elastic band stretched circumferentially around the fingers and/or a clamping ring of relatively inextensible material that is adjustably constricted or cinched around the fingers or, if used, the elastic band for holding rigidly or relatively rigidly the fingers to the support. The elastic band is locally radially deformable to permit radial release of the axial interference for easy insertion and removal of a finger without disturbing adjacent fingers.

7 Claims, 5 Drawing Figures

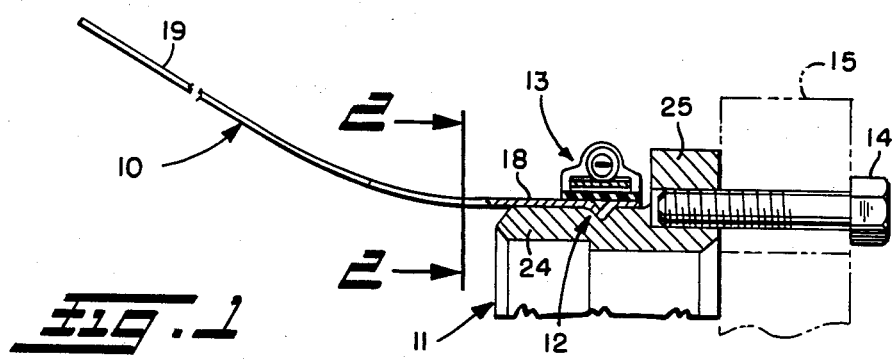
Fig. 1
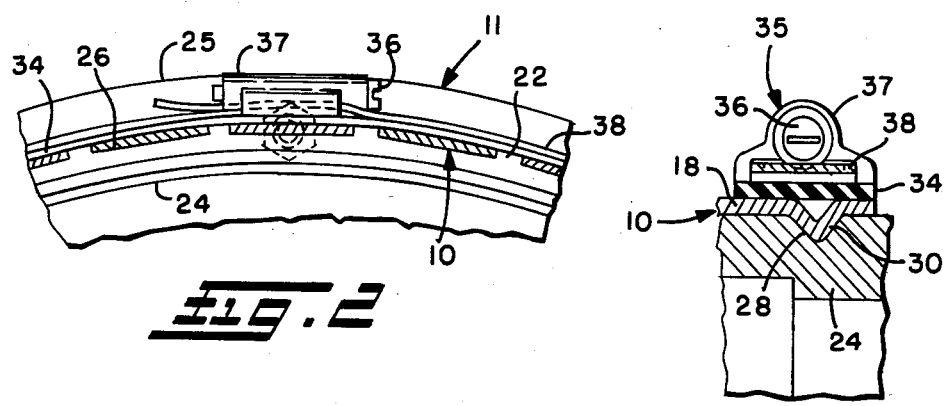
Fig. 2
Fig. 3
Fig. 5
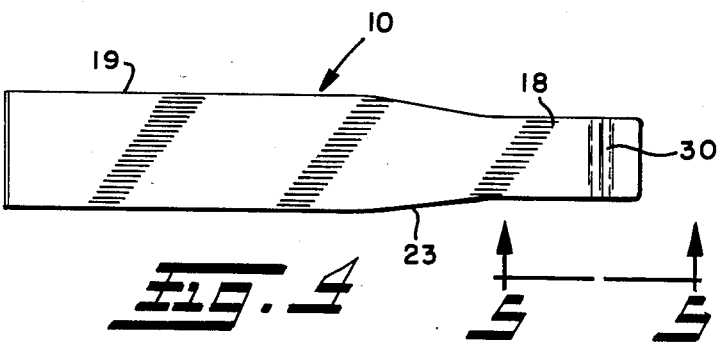
Fig. 4

FINGER PLY DOWN FOR TIRE BUILDING MACHINE

The invention herein disclosed relates generally to ply down assemblies for tire building machines and, more particularly, to a finger ply down in which an annular array of generally axially extending spring fingers are employed.

BACKGROUND OF THE INVENTION

Spring finger ply downs are generally employed at each axial end of the drum of a tire building machine. Such assemblies generally comprise an annular array of generally axially extending spring fingers mounted to a support with their ply engaging ends projecting from the support toward the center of the drum and radially outwardly at an angle when in their unflexed condition. Such fingers are usually flexed radially inwardly by the axial movement of a bead setting device causing the ply engaging ends thereof to sweep or fold inwardly liner or ply material overhanging the ends of the drum. In this manner the materials of the tire are turned down over the shoulder or edge of the drum to form a shoulder of tire material rigidly backed by the edge or shoulder of the drum for receipt of the tire bead. Thereafter with the bead setter and ply down retracted axially away from the drum, the ply material will normally be turned and stitched around the bead and up over the top of the drum by a dual bladder assembly such as seen, for example, in Cannurati U.S. Pat. No. 3,438,832 or in Enders U.S. Pat. No. 4,302,274.

A problem associated with early spring finger ply downs was that they were difficult to assemble. Also, replacement of a damaged or bent finger in such ply down assemblies was a difficult and tedious task. The problem is similar to trying to assemble a barrel without special tools or jigs, or trying to replace a single barrel stave without affecting adjacent barrel staves. In such ply down assemblies, the fingers usually were clamped between two rings which had to be separated for assembly of the fingers or removal of a single finger. Consequently, assembly of the fingers or replacement of a single finger was difficult to accomplish without affecting or loosening adjacent fingers.

One approach to the problem is disclosed in U.S. Pat. No. 4,238,268. In tnis patent the spring fingers are mounted between inner and outer rings that are secured together by a plurality of mounting screws. At least one ring is formed of an elastomer and each finger has a radially inwardly bent toe which hooks over the inner ring. When a finger is to be removed, the mounting screws nearest the finger on each side thereof are removed so that the elastomeric ring can then be bent or distorted radially away from the finger a distance sufficient to free its toe thereby to permit withdrawal of the finger. A replacement finger then may be inserted in reverse manner. Although it may be possible to carry out this operation without freeing adjacent fingers, replacement of a single finger would still be somewhat tedious requiring several mounting screws to be removed and then secured back into place. Obviously, replacement of several fingers would present a more tedious project as would the initial assembly of the ply down. Also, a rather large number of mounting screws are needed. Moreover, the inner ring located interiorly of the fingers must be large enough in radial thickness to accommodate the mounting screws and this may preclude the use of long length turn-up bladders because of inadequate interior clearance.

In Yuhas U.S. Pat. No. 4,353,771, there is disclosed a finger ply down assembly which affords greater facility of the assembly and/or replacement of the spring fingers. The fingers are secured between two nested rings which are constructed to interfit with each other and with each finger so that each finger may be inserted or removed by simply flexing the finger to clear a projection on one of the rings which interfits with the finger in its normal position. With such assembly, a finger may be inserted or removed without disturbing adjacent fingers and without disassembly of the nested rings even at an area approximate the finger to be inserted or removed. Also, one of the rings may be made of a locally deformable material to permit each finger to be bent to clear the interfitting projection thereby to assist in the insertion and removal of the finger.

SUMMARY OF THE INVENTION

The subject invention provides a finger ply down for a tire building machine which comprises an annular array of generally axially extending spring fingers, an annular support for the fingers, an axial interference between the support and each finger, and a constrictable clamp securing each finger of the array to the support at such interference. The interference may include radially interfitting protrusions and recesses which interfere axially to lock the fingers to the support when the fingers are held radially to the support by the constrictable clamp. The constrictable clamp may include an elastic band stretched circumferentially around the fingers on the support and/or a clamping ring adjustably constricted or cinched around the fingers and preferably, if provided, the elastic band for holding rigidly or essentially rigidly the fingers to the support.

Respecting the method of the invention, insertion or removal of the fingers is greatly facilitated by the use of an elastic band stretched around the support for holding the fingers inserted therebetween to the support. The elastic band is locally radially deformable to permit radial release of the axial interference thereby to enable easy insertion or removal of a finger while continuing to hold, and hence without disturbing, adjacent fingers. A clamping ring formed from relatively inextensible material then may be constricted, as by an adjustment mechanism, around the elastic band or directly around the fingers to hold essentially rigidly or rigidly the fingers to the support.

Further in accordance with the invention, each spring finger may be formed with a bead-like protrusion or detent projecting from the generally planar or axial extent thereof which serves to interfit radially with a groove in the annular support to provide the axial interference between the finger and support. Preferably, the detent is formed from the spring finger as by bending an area of the spring finger to form a bead or rib that fits in the groove in the support. The thusly formed bead of each spring finger may be inserted between the annular support and a clamping band expanded slightly to permit such insertion but not so far as would release the interference between other fingers held by the clamping band to the support, thereby to effect insertion and removal of fingers without the use of an elastic band. Preferably the bead of each finger and the groove in the support are of corresponding V-shape.

Advantages of the subject invention include simplicity, ease of assembly and disassembly, reduction in parts, cost improvement and better interior clearance to enable, for example, use of long length turn-up bladders.

To the accomplishment of the foregoing and related ends, the invention then comprises the features hereinafter fully described and particularly pointed out in the claims, the following description and the annexed drawings setting forth in detail a certain illustrative embodiment of the invention, such being indicative, however, of but one of the various ways in which the principles of the invention may be employed.

BRIEF DESCRIPTION OF THE DRAWING

In the annexed drawing:

FIG. 1 is a fragmentary axial section of a spring finger ply down according to the present invention;

FIG. 2 is a fragmentary radial section of the ply down assembly taken substantially along the line 2—2 of FIG. 1;

FIG. 3 is an enlarged portion of FIG. 1;

FIG. 4 is a plan view of a spring finger used in the ply down assembly; and

FIG. 5 is an enlarged fragmentary side elevation of the spring finger as viewed from the line 5—5 of FIG. 4.

DETAILED DESCRIPTION

With reference to FIGS. 1 and 2, a spring finger ply down according to the invention comprises an annular array of spring fingers 10, a finger mounting ring 11, an axial interference 12 between each finger and the finger mounting ring, and a constrictable clamp 13 for securing each finger to the finger mounting ring at the interference 12. The ply down may be conventionally employed in a tire building machine as by securing the finger mounting ring 11 by bolts 14 to a ply down transfer ring 15 which is movable axially of the drum of the tire building machine. For a general discussion of how a spring finger ply down is employed in a tire building machine, reference may be had to Yuhas U.S. Pat. No. 4,353,771. As will be appreciated, a spring finger ply down according to the present invention may be utilized with various types of tire building machines such as a first stage machine or a single stage machine.

The spring fingers 10 may be flat strips of spring steel having a length several times their width. As shown, the spring fingers are clamped at their root ends 18 by the constrictable clamp 13 to the finger mounting ring 11. In their normal or unflexed condition, the spring fingers extend axially at their root ends 18 and then angularly outwardly at their ply engaging ends 19 as is typical of spring finger ply downs. In such unflexed condition, the ply engaging ends 19 of the spring fingers form a generally axially projecting cone that may be positioned around tire material overhanging the end of the drum of a tire building machine. Then, the ply engaging ends 19 of the spring fingers may be moved radially inwardly, as by an axially inwardly moving bead setting ring, to sweep the overhanging tire material down over the shoulder of the drum for subsequent setting of a bead against the turned down tire material. When axially retracted clear of the tire material and released, the spring fingers will spring back to their unflexed condition seen in FIG. 1.

The ply engaging ends 19 of the spring fingers 10 preferably have a width such that they will collectively form an essentially continuous cylindrical surface when moved radially inwardly generally coplanar with their root ends 18 during the ply down operation. On the other hand, the root end 18 of each spring finger has a lesser width as seen in FIG. 4 for close fitted receipt between axially extending ribs 22 at the outer diameter (O.D.) of the finger mounting ring 11. As further seen in FIG. 4, the sides of each finger are tapered at 23 to provide a relatively smooth transition between the ends thereof having different widths.

As seen in FIGS. 1 and 2, the finger mounting ring 11 has a generally L-shaped cross-section with one leg 24 extending axially inwardly to support the spring fingers 10 at its O.D. and the other leg 25 extending radially outwardly for mounting, for example, to the transfer ring 15. The finger support leg 24 is provided on its outer diameter surface with a series of axially extending chordal flats 26 between the axially extending ribs 22. The ribs 22 preferably extend radially above the flats 26 by an amount only slightly greater than the thickness of the spring fingers 10.

The support leg 24 need only have a radial thickness sufficient to provide adequate support for fingers 10 clamped thereto by the constrictable clamp 13. The support leg does not have to be radially oversized to accommodate, for example, mounting screws used to secure inner and outer rings together in prior art devices. As a result of this, better interior clearance may be provided to enable, for example, the use of long length turn-up bladders.

As best seen in FIG. 3, each flat 26 is provided with a groove 28 that extends between and perpendicularly to the adjacent ribs 22, i.e., generally circumferentially, and which is located medially of the axial ends of the flat. To facilitate machining of the grooves, the grooves may extend through the adjacent ribs. As shown, the grooves preferably have a V-shape which may have an included angle of about 90°, for example.

For radial interfit with a respective groove 28, each spring finger 10 is provided at its root end 18 with a detent or protrusion 30 that projects from the generally planer or axial extent thereof, i.e., below the bottom surface of the root end that will be supported on the respective flat 26 when positioned as shown in FIG. 3. The detent 30 preferably is formed by bending an area of the finger root end to form a bead or rib as seen in FIG. 5. The bead preferably has a V-shape corresponding to that of the groove as best seen in FIG. 3.

The bent bead 30 and groove 28 radially interfit to provide the above-referenced axial interference 12 when the root end of the spring finger 10 is clamped at a respective flat 26 by the constrictable clamp 13. When thusly assembled, the fingers will be securely held against axial displacement because of the axial interference, i.e., the radially interfitting bead and groove. The fingers also will be held with a snug fit between the ribs 22 which prevent lateral shifting of the fingers supported on the flats 26.

In the illustrated preferred embodiment of the invention, the constrictable clamp 13 includes an elastic band 34 and a clamping ring 35. The clamping ring 35 may be similar to a conventional hose clamp but has a relatively large diameter. The clamping ring preferably is of single point adjustment type and, as seen in FIGS. 1–3, includes a worm screw 36 mounted for rotation in a housing 37 that is fastened to one end of an inextensible metal clamping band 38. The worm screw 36 has screw lands that are engageable in slots at the other end of the clamping band 38 that passes through the housing 37 between the screw and the end of the clamping band to which the housing is secured. By rotating the worm screw in one direction as with use of a large screwdriver, the slotted end of the clamping band may be drawn into the housing to reduce the effective circumferential length of the clamping band thereby to constrict the clamping ring. On the other hand, rotation of the worm screw in the opposite direction will adjustably pay the slotted end of the clamping band out of the housing to lengthen the effective circumference of the clamping band thereby to expand the clamping ring. As will be appreciated, other types of clamping rings or devices other than that illustrated may be utilized such as, for example, two facing C-shape clamps with two points of adjustment at respective adjacent ends thereof.

According to a preferred method of assembling the ply down in accordance with the invention, initially the elastic band 34, which is akin to a large rubber band, is stretched circumferentially around the finger mounting ring 11 preferably at a location axially overlapping the grooves 28. Each spring finger 10 then may be slipped under the elastic band at a respective flat 26 on the finger mounting ring 11. As the spring finger is inserted, the elastic band will deform radially outwardly to permit passage of the protruding bead 30 to its position radially interfitting with the groove 28 at the flat. Such deformation will be localized such that previously inserted fingers then held by the elastic band to the finger mounting ring will not be disturbed. This insertion procedure may be continued until all of the spring fingers have been inserted and are held in place by the elastic band at respective flats on the finger mounting ring. The clamping ring 35 may then be constricted around the root ends of the fingers axially overlapping the finger mounting ring to secure more rigidly each spring finger to the finger mounting ring at the axial interference 12.

As seen in FIGS. 1 and 3, the clamping ring 35 preferably has an axial width greater than that of the protruding bead 30 and groove 28 and further is positioned axially to span the protruding bead for engagement with the root end 18 of the spring finger at both axial sides of the protruding bead. The clamping ring also preferably is positioned to circumscribe the elastic band 34 and further is constricted sufficiently to compress the elastic band to a relatively rigid condition for secure holding of the spring fingers to the finger mounting ring 11.

Respecting removal of a spring finger 10 from the fully assembled ply down, such can be accomplished by simply expanding the clamping ring 35 sufficiently to allow the elastic band 34 to deform radially outwardly to enable the protruding bead 30 to clear the finger support ring axially inwardly of the groove 28. A new finger can then be inserted as aforedescribed and then the clamping ring adjustably constricted to again secure the fingers in place.

The subject invention also encompasses usage of the elastic band 34 without a clamping ring 35 or equivalent device. In this case, there would be used a thicker and stronger elastic band capable of providing adequate force holding each spring finger 10 to the finger mounting ring 11 at the interference 12. That is, the holding force must be great enough to prevent the protruding bead 30 from disengaging the groove 28 when the fingers are subjected to axial forces during the ply down operation.

The invention also encompasses usage of only the clamping ring 35 or similar clamping device consisting, for example, of a circumferentially inextensible band or band segments with one or more adjustments for constricting and expanding the clamping ring. When an elastic band is not used, assembly may be accomplished as by positioning the clamping ring around the finger mounting ring 11 and adjusting the same to provide a small clearance between the clamping ring and a flat 26 on the finger mounting ring sufficient to permit insertion of a spring finger 10 between the clamping ring and the finger mounting ring at the flat. In similar manner the other fingers may be installed and then the clamping ring constricted tightly around the finger mounting ring to hold the fingers to the finger mounting ring at the axial interference. Thereafter a single finger can be removed by slightly expanding the clamping ring sufficiently to enable removal of the spring finger while continuing to hold the other spring fingers to the finger mounting ring sufficiently close to keep their respective protruding beads in a condition of axial interference with respective grooves in the finger mounting ring.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the following claims.

The embodiments of the invention in which an exclusive property or privilege is claimed are defined as follows:

1. A finger ply down for a tire building machine comprising an annular array of generally axially extending fingers, an annular support for said fingers, an axial interference between said support and each finger of the array located within the edges of said support, and constrictable clamp means radially to constrict and secure each finger of the array respectively at the axial interference, said axial interference including radially interfitting protrusions and grooves which interfere axially to lock the fingers to the support.

2. A finger ply down as set forth in claim 1, wherein said protrusions and grooves have corresponding V-shapes.

3. A finger ply down as set forth in claim 1, wherein said protrusions are on said fingers and said grooves in said support.

4. A finger ply down as set forth in claim 3, wherein said protrusions are beads bent from said fingers.

5. A finger ply down for a tire building machine comprising an annular array of generally axially extending fingers, an annular support for said fingers, an axial interference between said support and each finger located within the edges of said support, an elastic band circumferentially stretched around the fingers on said support, and releasable clamp means tightenable around said fingers for radially constricting and securing each finger to the support at such interference, said axial interference including radially interfitting protrusions and grooves which interfere axially to lock the fingers to the support.

6. A finger ply down as set forth in claim 5, wherein said annular support includes axially extending ribs to maintain respective fingers therebetween.

7. A finger ply down as set forth in claim 5, wherein said clamp means includes a clamping band with single point adjustment.

* * * * *